United States Patent [19]

Collins et al.

[11] Patent Number: 4,816,107

[45] Date of Patent: Mar. 28, 1989

[54] ACETAL POLYMER BONDED ARTICLES AND METHOD OF MAKING SAME

[75] Inventors: George L. Collins, Maplewood; Kurt F. Wissbrun, Short Hills, both of N.J.

[73] Assignee: Hoechst Celanese Corp., Somerville, N.J.

[21] Appl. No.: 96,189

[22] Filed: Sep. 14, 1987

[51] Int. Cl.$^4$ .................................................. C09J 5/02
[52] U.S. Cl. ...................................... 156/327; 156/83; 428/411.1; 428/524; 428/525; 528/249
[58] Field of Search ............... 156/83, 327; 428/411.1, 428/524, 525; 528/249

[56] References Cited

U.S. PATENT DOCUMENTS

| | | | |
|---|---|---|---|
| 3,026,229 | 3/1962 | Wilcox | 156/306.6 |
| 3,227,670 | 1/1966 | Regan | 156/327 |
| 3,297,647 | 1/1967 | Schott et al. | 528/249 |
| 3,385,827 | 5/1968 | Fischer et al. | 528/249 |
| 3,477,992 | 11/1969 | Köcher et al. | 528/249 |
| 3,639,192 | 2/1972 | Burg et al. | 156/327 |

*Primary Examiner*—John J. Gallagher
*Attorney, Agent, or Firm*—Lyon & Lyon

[57] ABSTRACT

Oxymethylene polymer bonded articles, such as multilayer laminates, are disclosed. Such articles are prepared by bonding together at least two articles shaped or molded from crystalline oxymethylene homo-, co- and terpolymers using, as an adhesive, a low Tg copolymer of trioxane and 1,3-dioxolane which have a dioxolane content greater than 65 mol percent and less than about 75 mol percent and an IV of from about 1.0 to about 2.3, and which are non-crystalline at room temperature or above.

34 Claims, No Drawings

ACETAL POLYMER BONDED ARTICLES AND METHOD OF MAKING SAME

BACKGROUND OF THE INVENTION

1. Field of the Invention

This invention relates to novel bonded articles, such as multilayer laminates, made from acetal polymers. More particularly, this invention relates to novel oxymethylene polymer bonded articles, such as multilayer laminates, in which at least two articles shaped or molded from conventionally prepared crystalline oxymethylene homo-, co- and terpolymers are bonded together using, as an adhesive, a novel low Tg (glass transition temperature) copolymer of trioxane and 1,3-dioxolane which, by virtue of having a higher dioxolane content than hitherto contemplated in the prior art, is non-crystalline at room temperature (about 25° C.) or above, although it can be made to crystallize at temperatures below room temperature. Such low Tg non-crystalline copolymers are disclosed in commonly-assigned copending U.S. patent application Ser. No. 096,188, filed of even date herewith in the names of George L. Collins, Paul Zema and William Pleban and entitled "Low Tg Non-Crystalline Acetal Copolymers".

2. Description of the Prior Art

Acetal or oxymethylene copolymers, including ones made from trioxane and dioxolane as the comonomer pair, are well known in the art. Such copolymers are characterized as having recurring oxymethylene groups or units, i.e., —CH$_2$O—groups, interspersed with oxy(-higher)alkylene groups or units, e.g., —CH$_2$CH$_2$O— groups. They may be prepared, for example, as described in Walling et al U.S. Pat. No. 3,027,352 by copolymerizing trioxane, the source of the —CH$_2$O—group, with a cyclic ether or cyclic formal having at least two adjacent carbon atoms, e.g., ethylene oxide, 1,3-dioxolane, 1,4-butanediol formal, and the like, in the presence of a catalyst, e.g., boron trifluoride diethyl etherate or the like.

Japanese Kokai Sho 42-22065, Yamoda et al., published Oct. 30, 1967 discloses that the product of its Example 1, a trioxane/1,3-dioxolane copolymer, contained 64 mol percent dioxolane, but says no more about this product.

Copolymers of 1,3-dioxolane and formaldehyde (which can be derived from trioxane) containing no less than 50 mol percent of oxymethylene units are disclosed in U.S. Pat. No. 3,639,347, issued Feb. 1, 1972 to Sugiura et al. These copolymers are disclosed as being in all cases tough, crystalline materials having melting points above 150° C.

U.S. Pat. Nos. 3,598,788 and 3,639,192, issued Aug. 10, 1971 and Feb. 1, 1972, respectively, to Burg, disclose trioxane copolymers containing major amounts (in each case up to 60 weight percent) of comonomers such as dioxolane or 1,4-butanediol formal. The '788 patent, however, describes its polymers as ones which can be used for "injection molding, extrusion, or deep drawing", and as grindable solids having melting points ranging from 70° C. to 161° C. The '192 patent specifically describes a material that is "tough and solid" and heat-meltable.

U.S. Pat. Nos. 3,379,655 and 3,422,035, issued Apr. 23, 1968 and Jan. 14, 1969, respectively, to May et al., broadly disclose trioxane/1,3-dioxolane copolymers wherein dioxolane "will make up between 0.01 and 50% of the units of the polymer" (see the '655 patent at column 1, lines 37–69 and the '035 patent at column 1, lines 35–69). Each of these patents also contains a working example in which 30 grams of dioxolane is copolymerized with 0.9 gram of trioxane (see Example 8 of the '655 patent; Example 4 of the '035 patent). However, the polymers obtained in these two working examples are characterized as having melting points of 54°–55° C. and 51°–52° C., respectively (the polymer of Example 4 of the 3035 patent was processed by being "broken up and milled in acetone"), indicating that they were crystalline solids at room temperature.

In Example 4 of U.S. Pat. No. 3,337,507, issued Aug. 22, 1967 to Gutweiler et al, ⅓ mol of trioxane was polymerized with 1 mol of dioxolane, using p-nitrophenyldiazoniumfluoroborate catalyst, to give a clear, highly viscous oil at 70° C. Upon cooling to room temperature, however, the polymer became a crystalline solid, since it was:

"...subsequently cooled in the polyethylene bag. The crystals were ground, boiled with methanol to which 1% of ethanol amine had been added and then dried."

U.S. Pat. No. 3,194,788, issued July 13, 1965 to Kullmar et al, discloses in its Example 6 the polymerization of 5 parts by weight of trioxane with 15 parts of diethlene glycol formal, using p-nitrophenyldiazoniumfluoroborate catalyst, to give a colorless, thickly liquid oil which solidified to a wax-like mass on standing. No indication is given that non-crystalline behavior was obtained or is possible in this polymer.

Various dioxolane-containing acetal terpolymers are also known. For example, U.S. Pat. No. 3,848,020, issued Nov. 12, 1974 to Burg et al, discloses a trioxane/dioxolane/1,6-hexanediol formal terpolymer in which these three monomers were used in a 55:35:10 weight percent ratio. The terpolymer obtained had a melting point of 70° C., indicating that it was a crystalline polymer.

U.S. Pat. No. 3,693,349, issued Feb. 1, 1972 to Burg, discloses trioxane/dioxolane/polyethylene oxide terpolymers which contain up to 60 weight percent dioxolane and may also contain a minor amount of a formal, glycidyl ether or prepolymer component. Polymers having "very good impact toughness coupled with good stability to alkalies" were obtained.

Trioxane/dioxolane/unsaturated diol formal terpolymers are disclosed in U.S. Pat. No. 3,297,647 to Schott et al. The patentees have this to say about their polymers:

"The physical properties of the terpolymers can be varied within wide limits and depend, on the one hand, on the nature and concentration of the saturated cyclic formal or saturated cyclic ether and, on the other hand, on the concentration of the formal of an unsaturated cyclic diol.

For example, when 0.1 to 10% by weight, calculated on the total monomer mixture, of unsaturated cyclic formal and 0.1 to 10% by weight, calculated on the total monomer mixture, of saturated cyclic formal or ether are used, highly crystalline products are obtained, whereas with 40 to 59.9% by weight, calculated on the total monomer mixture of unsaturated cyclic formal or ether, amorphous elastic glass-clear products are obtained. The more voluminous the second comonomer, the lower is the crystallinity and the higher is the elasticity. The decrease in crystallinity can be well measured by means of X-rays.

Low molecular weight polymers which constitute waxes or oils can easily be obtained with the use of high concentrations of catalyst, that is about 0.1 to 1% by weight, calculated on the total monomer mixture.

The above statements are intended to indicate the wide limits within which the properties of the terpolymers obtained by the process of the invention may be varied, the incorporation of different comonomers having, of course, different effects on the properties of the terpolymers and the transitions being fluid", column 2, lines 25-52. However, no high dioxolane content polymers are specifically disclosed, although Schott et al do state that "(t)he cyclic ether or saturated cyclic formal is advantageously used in an amount of 59.9 to 0.1% by weight, calculated on the total monomer mixture", and only terpolymers are disclosed.

None of the aforementioned patents or the published Japanese patent application teach trioxane/1,3-dioxolane copolymers which exhibit non-crystalline behavior at or above room temperature and low glass transition temperatures, or the use of such low Tg non-crystalline copolymers as bonding agents or adhesives for crystalline oxymethylene homo-, co- and terpolymers.

SUMMARY OF THE INVENTION

Collins et al copending U.S. patent application Ser. No. 096,187 discloses that trioxane/1,3-dioxolane copolymers having a dioxolane content greater than 65 mol percent and less than about 75 mol percent, and particularly a dioxolane content of about 70 mol percent (these mol percentages being based on the total mols of trioxane and 1,3-dioxolane present in the copolymer), and an intrinsic viscosity (IV) of from about 1.0 to about 2.3, e.g., an intrinsic viscosity greater than about 1.0, such as 1.5, as determined by standard viscometric measurement, e.g., in o-chlorophenol, exhibit reduced melting points as compared to trioxane/dioxolane copolymers having dioxolane contents lower than 65 mol percent or higher than about 75 mol percent.

In other words, the melting points of trioxane/dioxolane copolymers having dioxolane contents and IV's within the abovementioned ranges are at a minimum at or below room temperature (about 25° C.) in comparison to those of trioxane/dioxolane copolymers having dioxolane contents outside the 65 mol percent to about 75 mol percent range.

Because these high dioxolane copolymers melt at or below room temperature, crystallites do not form in them. Thus, these non-crystalline polymers have a clear or translucent appearance. In addition, the suppression of crystallinity in such copolymers as a consequence of their dioxolane content continues even at temperatures below room temperature. As a result, such copolymers have a glass transition temperature at less than about $-60°$ C., e.g., at about $-65°$ C.

It has now been discovered that these low Tg non-crystalline high dioxolane content trioxane/1,3-dioxolane copolymers are excellent bonding agents or adhesives for bonding articles shaped or molded from conventionally prepared crystalline oxymethylene homo-, co- and terpolymers, e.g., for preparing multilayer laminates from acetal polymers.

It is therefore an object of this invention to provide novel bonded articles, such as multilayer laminates, made from acetal polymers.

It is also an object of this invention to provide novel oxymethylene polymer bonded articles, such as multilayer laminates, in which two or more shaped or molded articles prepared from conventional oxymethylene homo-, co- or terpolymers are bonded together using, as an adhesive, a low Tg non-crystalline copolymer of trioxane and 1,3-dioxolane having a higher dioxolane content than hitherto contemplated in the prior art.

A further object of this invention is to provide a novel method of bonding acetal polymer articles.

These and other objects, as well as the nature, scope and utilization of this invention, will become readily apparent to those skilled in the art from the following description and the appended claims.

DETAILED DESCRIPTION OF THE INVENTION

The Novel Low Tg Non-Crystalline Copolymers

As disclosed in Collins et al copending U.S. patent application Ser. No. 096,187, the low Tg non-crystalline trioxane/1,3-dioxolane copolymers used as bonding agents or adhesives in practicing this invention are preferably prepared by bulk polymerizing a solution of trioxane dissolved in from at least 65 mol percent to about 75 mol percent, e.g., about 70 mol percent, of 1,3-dioxolane, these mol percentages being based on the total mols of trioxane and 1,3-dioxolane present as the reaction mixture. The reaction will be carried out under an inert atmosphere, e.g., one obtained using dry nitrogen, argon, or the like, or a mixture of inert gases, in the presence of a catalytically effective amount of a cationic polymerization catalyst, such as p-nitrobenzenediazoniumfluoroborate, trifluoromethanesulfonic acid, boron trifluoride, a boron trifluoride etherate, or the like, e.g., an amount ranging from about $1 \times 10^{-4}$ M/l to about $5 \times 10^{-3}$ M/l, and preferably from about $1 \times 10^{-3}$ M/l to about $1.5 \times 10^{-3}$ M/l, based on the volume of the reaction medium (reactants plus any solvents or suspending agents employed).

The polymerization reaction will usually be carried out at a temperature of from about 15 to about 30° C., and preferably at from about 20° to about 25° C., at pressures ranging from about 750 to about 770 psi, for from about 15 to about 30 hours, preferably for from about 20 to about 25 hours.

These polymers can also be prepared under the foregoing conditions by polymerizing trioxane and 1,3-dioxolane in a solvent or suspending agent for the monomers, e.g., a halogenated hydrocarbon such as methylene chloride, a hydrocarbon such as hexane, cyclohexane, nonane or dodecane, an ether, or the like, or a mixture of two or more of these or other suitable solvents or suspending agents.

Crystalline Oxymethylene Polymers Bondable with Low Tg Non-Crystalline Copolymers Crystalline oxymethylene polymers useful in preparing shaped or molded articles bondable in accordance with this invention are well known in the art. Such polymers are characterized in general as having recurring oxymethylene groups or units. The term oxymethylene polymer as used herein is intended to include any oxymethylene polymer having oxymethylene groups which comprise at least about 50 percent, and generally at least about 85 percent, of the polymer's recurring units, i.e., homopolymers, copolymers, terpolymers and the like.

Typically, oxymethylene homopolymers, or polyformaldehydes or [poly(oxymethylenes)], are prepared by polymerizing anhydrous formaldehyde or trioxane, a cyclic trimer of formaldehyde. For example, high molecular weight polyoxymethylenes have been prepared by polymerizing trioxane in the presence of certain fluoride catalysts, such as antimony fluoride. Polyoxymethylenes may also be prepared in high yields and at rapid reaction rates by the use of catalysts comprising boron fluoride coordination complexes with organic compounds, as described in U.S. Pat. No. 2,898,506 to Hudgin et al.

Oxymethylene homopolymers are usually stabilized against thermal degradation by end-capping with, for example, ester or ether groups such as those derived from alkanoic anhydrides, e.g., acetic anhydride, or dialkyl ethers, e.g., dimethyl ether, or by incorporating stabilizer compounds into the homopolymer, as described in U.S. Pat. No. 3,133,896 to Dolce et al.

Oxymethylene copolymers which are especially suitable for use in preparing shaped or molded articles bondable by the method of this invention will usually possess a relatively high level of polymer crystallinity, i.e., about 70 to 80 percent or higher. These preferred oxymethylene copolymers have repeating units which consist essentially of oxymethylene groups interspersed wth oxy(higher)alkylene groups represented by the general formula:

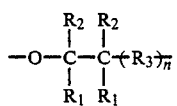

wherein each $R_1$ and $R_2$ is hydrogen or a lower alkyl group, each $R_3$ is a methylene, oxymethylene, lower alkyl-substituted methylene or lower alkyl-substituted oxymethylene group, and n is an integer from zero to three, inclusive. Each lower alkyl group preferably contains one or two cabon atoms.

Oxymethylene groups generally will constitute from about 85 to about 99.9 percent of the recurring units in such copolymers. The oxy(higher)alkylene groups incorporated into the copolymer during copolymerization produce the copolymer by the opening of the ring of a cyclic ether or cyclic formal having at least two adjacent carbon atoms, i.e., by the breaking of an oxygen-to-carbon linkage.

Copolymers of the desired structure may be prepared by polymerizing trioxane together with from about 0.1 to about 15 mol percent of a cyclic ether or cyclic formal having at least two adjacent carbon atoms, preferably in the presence of a catalyst such as a Lewis acid (e.g., $BF_3$, $PF_5$, and the like) or other acids (e.g., $HClO_4$, 1% $H_2SO_4$, and the like), ion pair catalysts, etc.

In general, the cyclic ethers and cyclic formals employed in making these preferred oxymethylene copolymers are those represented by the general formula:

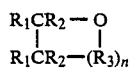

wherein each $R_1$ and $R_2$ is hydrogen or a lower alkyl group, each $R_3$ is a methylene, oxymethylene, lower alkyl-substituted methylene or lower alkyl-substituted oxymethylene group, and n is an integer from zero to three, inclusive. Each lower alkyl group preferably contains one or two carbon atoms.

The cyclic ether and cyclic formal preferred for use in preparing these preferred oxymethylene copolymers are ethylene oxide and 1,3-dioxolane, respectively. Among the other cyclic ethers and cyclic formals that may be employed are 1,3-dioxane, trimethylene oxide, 1,2-propylene oxide, 1,2-butylene oxide, 1,3-butylene oxide, 1,4-butanediol formal, and the like.

Oxymethylene copolymers produced from the preferred cyclic ethers have a structure composed substantially of oxymethylene and oxy(lower)alkylene, preferably oxyethylene, groups, and are thermoplastic materials having a melting point of at least 150° C. They normally are millable or processable at temperatures ranging from 180° C. to about 200° C., and have a number average molecular weight of at least 10,000 and an inherent viscosity of at least 1.0 (measured at 60° C. in a 0.1 weight percent solution in p-chlorophenol containing 2 weight percent of α- pinene).

These oxymethylene copolymers preferably are stabilized to a substantial degree prior to shaping or molding them into articles which will be bonded as taught by this invention. This can be accomplished by degradation of unstable molecular ends of the polymer chains to a point where a relatively stable carbon-to-carbon linkage exists at each end of each chain. Such degradation may be effected by hydrolysis, as disclosed, for example, in U.S. Pat. No. 3,219,623 to Berardinelli.

The oxymethylene copolymer may also be stabilized by endcapping, again using techniques well known to those skilled in the art. End-capping is preferably accomplished by acetylation with acetic anhydride in the presence of sodium acetate catalyst.

A particularly preferred class of oxymethylene copolymers is commercially available from Hoechst-Celanese Corporation under the designation CELCON ® acetal copolymer, and especially preferred is CELCON ®M25 acetal copolymer, which has a melt index of about 2.5 g/10 min. when tested in accordance with ASTM D1238-82.

Oxymethylene terpolymers having oxymethylene groups, oxy(higher)alkylene groups such as those corresponding to the above-recited general formula:

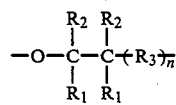

and a different, third group interpolymerizable with oxymethylene and oxy(higher)alkylene groups may be prepared, for example, by reacting trioxane, a cyclic ether or cyclic acetal and, as the third monomer, a bifunctional compound such as a diglycide of the formula:

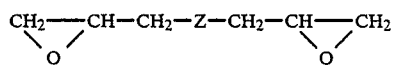

wherein Z represents a carbon-to-carbon bond, an oxygen atom, an oxyalkoxy group of 1 to 8 carbon atoms, inclusive, preferably 2 to 4 carbon atoms, an oxycycloalkoxy group of 4 to 8 carbon atoms, inclusive or an oxypoly(lower alkoxy)group, preferably one having from 2 to 4 recurring lower alkoxy groups each with 1 or 2 carbon atoms, for example, ethylene diglycide, diglycidyl ether and diethers of 2 mols of glycide and 1 mol of an aliphatic diol with 2 to 8 carbon atoms, advantageously 2 to 4 carbon atoms, or a cycloaliphatic diol with 4 to 8 carbon atoms.

Examples of suitable bifunctional compounds include the diglycidyl ethers of ethylene glycol; 1,4-butanediol; 1,3-butanediol; cyclobutane-1,3-diol; 1,2-propanediol; cyclohexane-1,4-diol and 2,2,4,4-tetramethylcyclobutane-1,3-diol, with butanediol diglycidyl ethers being most preferred.

Generally, when preparing such terpolymers, ratios of from 99.89 to 89.0 weight percent trioxane, 0.1 to 10 weight percent of the cyclic ether or cyclic acetal and 0.01 to 1 weight percent of the bifunctional compound are preferred, these percentages being based on the total weight of monomers used in forming the terpolymer. Ratios of from 99.85 to 89.5 weight percent of trioxane, 0.1 to 10 weight percent of cyclic ether or cyclic acetal and 0.05 to 0.5 weight percent of diglycidyl ether are particularly preferred, these percentages again being based on the total weight of monomers used in forming the terpolymer.

Terpolymer polymerization may be carried out according to known methods of solid, solution or suspension polymerization. As solvents or suspending agents, one may use inert aliphatic or aromatic hydrocarbons, halogenated hydrocarbons or ethers.

Trioxane-based terpolymer polymerization is advantageously carried out at temperatures at which trioxane does not crystallize out, that is, at temperatures within the range of from about $-50°$ C. to about $+100°$ C.

Cationic polymerization catalysts, such as organic or inorganic acids, acid halides and, preferably, Lewis acids, can be used in preparing the terpolymers. Of the latter, boron fluoride and its complex compounds, for example, etheratus of boron fluoride, are advantageously used. Diazonium fluoroborates are particularly advantageous.

Catalyst concentration may be varied within wide limits, depending on the nature of the catalyst and the intended molecular weight of the terpolymer. Thus, catalyst concentration may range from about 0.0001 to about 1 weight percent, and preferably will range from about 0.001 to about 0.1 weight percent, based on the total weight of the monomer mixture.

Since catalysts tend to decompose the terpolymer, the catalyst is advantageously neutralized immediately after polymerization using, for example, ammonia or methanolic or acetonic amine solutions.

Unstable terminal hemiacetal groups may be removed from the terpolymers in the same manner as they are from other oxymethylene polymers. Advantageously, the terpolymer is suspended in aqueous ammonia at temperatures within the range of from about 100° C. to about 200° C., if desired in the presence of a swelling agent such as methanol or n-propanol. Alternatively, the terpolymer is dissolved in an alkaline medium at temperatures above 100° C. and subsequently reprecipitated. Suitable alkaline media include benzyl alcohol, ethylene glycol monoethyl ether, or a mixture of 60 weight percent methanol and 40 weight percent water containing ammonia or an aliphatic amine.

The terpolymers may also be thermally stabilized by degrading unstable molecular ends of their chains to a point where a relatively stable carbon-to-carbon linkage exists at each end of each chain. Thermal stabilization will preferably be carried out in the absence of a solvent in the melt, in the presence of a thermal stabilizer.

Alternatively, the terpolymer can be subjected to heterogeneous hydrolysis wherein water, with or without a catalyst, e.g., an aliphatic or aromatic amine, is added to a melt of the terpolymer in an amount ranging from about 1 to about 50 percent by weight, based on the weight of the terpolymer. The resulting mixture is maintained at a temperature in the range of from about 170° C. to 250° for a specified period of time, and then washed with water and dried or centrifuged.

A preferred oxymethylene terpolymer is commercially available from Hoechst Celanese Corporation under the designation CELCON ®U10 acetal polymer, and is a butanediol diglycidyl ether/ethylene oxide/trioxane terpolymer containing about 0.05 weight percent, 2.0 weight percent, and 97.95 weight percent of repeating units derived from these termonomers, respectively, based on the total weight of these termonomers.

Plasticizers, formaldehyde scavengers, mold lubricants, antioxidants, fillers, colorants, reinforcing agents, light stabilizers and other stabilizers, pigments, and the like, which are customarily employed in oxymethylene polymer molding compositions can be used in the compositions from which shaped or molded articles bonded as taught by the present invention are fabricated.

Suitable formaldehyde scavengers include cyanoguanidine, melamine and melamine derivatives, such as lower alkyl- and amine-substituted triazines, amidines, polyamides, ureas, metal oxides and hydroxides, such as calcium hydroxide, magnesium hydroxide, and the like, salts of carboxylic acids, and the like. Cyanoguanidine is the preferred formaldehyde scavenger. Suitable mold lubricants include alkylene bisstearamides, longchain amides, waxes, oils, and polyether glycides. A preferred mold lubricant is commercially available from Glycol Chemical, Inc. under the designation Acrawax C, and is an alkylene bisstearamide. The preferred antioxidants are hindered bisphenols. Especially preferred is 1,6-hexamethylene bis-(3,5-di-t-butyl-hydroxyhydrocinnamate), commercially available from Ciba-Geigy Corp. under the designation Irganox 259.

A most preferred oxymethylene copolymer is commercially available from Hoechst Celanese Corporation under the designation CELCON ®M25-04 acetal polymer. This oxymethylene copolymer has a melt index of about 2.5 g/10 min. and contains 0.5 percent by weight Irganox 259, 0.1 percent by weight cyanoguanidine, and 0.2 percent by weight Acrawax C.

A most preferred oxymethylene terpolymer is commercially available from Hoechst Celanese Corporation under the designation CELCON ®U10-11 acetal polymer. This is the previously mentioned CELCON ®U-10 acetal terpolymer stabilized by 0.5 percent by weight Irganox 259 and 0.1 percent by weight calcium ricinoleate.

Articles shaped or molded from blends of the above-described low Tg non-crystalline high dioxolane content trioxane/1,3dioxolane copolymers with crystalline oxymethylene polymers as disclosed in Collins et al copending U.S. patent application. Ser. No. 096,187, as well as articles shaped or molded from UV cured mixtures of non-crystalline high dioxolane content trioxane/1,3-dioxolane/monoethylenically unsaturated aliphatic diol formal terpolymers and multifunctional crosslinking monomers blended with crystalline oxymethylene polymers as disclosed in commonly-assigned copending U.S. patent application Ser. No. 096,188, filed of even date herewith in the names of George L. Collins and Kurt F. Wissbrun and entitled "UV curable Crystalline Acetal Terpolymers", can also be bonded together as taught by this invention.

The crystalline oxymethylene polymers or blends containing crystalline oxymethylene copolymers are dried before being molded, preferably in desiccated air having a dew point of about −30° C. to −40° C. or lower, at a temperature of from about 70° C. to about 110° C., the drying time will depend primarily on the moisture content, drying temperature, and particular equipment employed, but typically will be from about 2 to about 6 hours or more. If drying is conducted for longer periods of time, such as overnight, the drying temperature should preferably be about 70° C. to about 85° C. In general, any conventional drying procedure can be used to reduce the moisture content to below about 0.1 weight percent, based on the weight of the oxymethylene polymer, preferably below about 0.05 weight percent, and most preferably below about 0.01 weight percent.

If conventional mold lubricants, plasticizers, fillers (particularly glass in the form of filaments or strands, beads, dust or microbubbles, any of which forms can be sized or otherwise combined with coupling agents), nucleating agents, antioxidants, formaldehyde scavengers, chain scission inhibitors, ultraviolet light inhibitors and similar molding additives have not previously been added to the oxymethylene polymer, they may be added at this time.

The crystalline oxymethylene polymer or polymer-containing blend is then comminuted mechanically, for example by chopping, pelletizing or grinding, into granules, pellets, chips, flakes or powders, and preferably dried again in the manner discussed above, then processed in the thermoplastic state, for example by injection molding or extrusion molding into shaped articles, including bars, rods, plates, sheets, films, ribbons, tubes, and the like.

Shaped or molded articles made from crystalline oxymethylene polymers or polymer blends can be bonded together using the above-described low Tg non-crystalline high dioxolane content trioxane/1,3-dioxolane copolymers by applying the non-crystalline copolymer to one or both surfaces to be bonded together, e.g., to the surfaces of two or more crystalline oxymethylene polymer sheets or films being formed into a multilayer laminate, and bringing the surfaces into contact. Better bonding or adhesion results from the application of heat and pressure to the articles being bonded to force the bonding surfaces into more intimate contact and allow penetration of the non-crystalline copolymer into the crystalline oxymethylene polymer articles surfaces.

Pressures of from about 500 to about 20,000 psi, preferably from about 1000 psi to about 4000 psi, and most preferably from about 2000 to about 2500 psi, applied at temperatures of from about 100° C. to about 250° C., and preferably of from about 130° C. to about 190° C., for from about 0.5 to about 15 minutes, preferably from about 4 to about 10 minutes, such as can be obtained using typical laminating pressures such as a Wabash press will be employed.

The non-crystalline copolymer can be applied to the surfaces being bonded as such or as a solution or paste in a suitable solvent such as hexafluoroisopropanol, methylene chloride, dimethylformamide, or the like, particularly a solvent which will swell the surface of the crystalline oxymethylene polymer article to which the adhesive or bonding composition is applied to facilitate interpenetration between the non-crystalline copolymer and crystalline oxymethylene polymer phases and which will evaporate during or following the bonding step.

In order that those skilled in the art can more fully understand this invention, the following examples are set forth. These examples are given solely for purposes of illustration, and should not be considered as expressing limitations unless so set forth in the appended claims. All parts and percentages are by weight, unless otherwise stated.

EXAMPLE I

One-hundred-twenty-five ml of 1,3-dioxolane and 75 ml of freshly distilled trioxane are injected into a clean, dry 500 ml round bottom flask which is purged with dry nitrogen gas and held at room temperature (about 25° C.). Next, $1 \times 10^{-3}$ mol/liter of p-nitrobenzene-diazoniumfluoroborate as a solution in nitromethane is injected into the flask. The monomer solution becomes viscous over an approximately 1.5 hour period. Polymerization is allowed to continue overnight.

The flask is then broken at liquid nitrogen temperature and the viscous polymer mass is removed and admixed with 200 ml of methylene dichloride in a 1000 ml beaker. This mixture is then allowed to shake for 24 hours on a shake table. The resulting viscous solution is added to 1000 ml of cold ethanol and stirred with a mechanical shaft stirrer at 400 rpm for 1-2 hours.

The resulting two-phase mixture is placed in an ice bath and let stand for 2 hours, after which time a white, viscous polymer mass settles. The ethanol is decanted and the polymer mass is then dried in a hood.

NMR analysis indicates that the polymer contains 27 mol percent trioxane and 73 mol percent 1,3-dioxolane. The polymer has the following physical properties:

Melting Point 22° C.

IV 2.0

Tg (determined by Differential Scanning Calorimetry) −65° C.

EXAMPLE II

Half of one surface (widthwide) of a flat strip molded from CELCON ®M25-04 crystalline trioxane/1,3-dioxolane oxymethylene copolymer is coated with a layer of a viscous solution prepared by dissolving 0.5 part of the low Tg non-crystalline trioxane/1,3-dioxolane copolymer prepared as described in Example I hereinabove in 3.0 parts of hexafluoroisopropanol.

An indentical but uncoated oxymethylene polymer strip is then hand pressed on the coated surface of the first strip so as to leave the uncoated ends of each strip protruding in opposite directions away from the coated surfaces.

The thus-prepared laminate is placed in a vacuum oven at 80° C. and let stand in the oven overnight. After cooling to room temperature the two strips do stick together, but can be forced apart by applying force in opposite directions from the coated surfaces.

EXAMPLE III

Several pellets of CELCON ® M25-04 oxymethylene copolymer molding resin were pressed between two sheets of Teflon polytetrafluoroethylene resin in a Wabash press operated at 190° C. and 20,000 psi for 0.5 minute to give a thin film.

This film was then laid in the press on a Teflon resin sheet, a small amount of the low Tg non-crystalline trioxane/1,3-dioxolane oxymethylene copolymer prepared as described in Example I hereinabove was spread on top of it and another such CELCON ® polymer film was placed over the adhesive and covered with a second Teflon sheet. The two layer laminate was then subjected to a pressure of 500 psi at 190° C. for 30 seconds; these conditions are identified in Table I below as "Run 1".

This procedure was then repeated in every detail except for the changes in laminating conditions noted in Table I below.

TABLE I

| Run | Pressure, psi | Temperature, °C. | Time, Sec. | Cooling[1] |
|---|---|---|---|---|
| 1 | 500 | 190 | 30 | No |
| 2 | 20,000 | 190 | 30 | No |
| 3 | 20,000 | 190 | 30 | Yes |
| 4 | 500 | 175 | 45 | No |
| 5 | 20,000 | 175 | 30 | Yes |
| 6 | 500 | 165 | 45 | No |
| 7 | 20,000 | 165 | 30 | Yes |
| 8 | 500 | 160 | 30 | No |
| 9 | 20,000 | 160 | 30 | No |
| 10 | 20,000 | 160 | 30 | Yes |

[1]Cooling, when used, was carried out at 20° C.

The laminates of runs 1–5 could not be separated, even when cut in half from the top layer through the bottom layer. There was an appreciable amount of flash around the edges of each of the laminates of Runs 1–3, less flash around the laminates of Runs 4 and 5.

Parts of the laminates of Runs 6 and 7 could be separated with difficulty; parts could not be separated at all. There was a small amount of flash around the edges of each laminate.

The laminates of Runs 8–10 could be completely separated and then stuck back together again. There was no flash around the edges of the laminates.

The above discussion of this invention is directed primarily to preferred embodiments and practices thereof. It will be readily apparent to those skilled in the art that further changes and modifications in the actual implementation of the concepts described herein can easily be made without departing from the spirit and scope of the invention as defined by the following claims.

We claim:
1. A method of bonding together at least two articles shaped or molded from a crystalline oxymethylene polymer which a comprises applying to a surface of at least one of said articles a coating comprising a low Tg non-crystalline copolymer of trioxane and 1,3-dioxolane having a 1,3-dioxolane content greater than 65 mol percent and less than about 75 mol percent, said percentages being based on the total mols of trioxane and 1,3-dioxolane present in said copolymer, and an intrinsic viscosity of from about 1.0 to about 2.3, and contacting the thus-coated surface with a surface of another such article.

2. A method as recited in claim 1 wherein said non-crystalline copolymer has an intrinsic viscosity greater than about 1.0.

3. A method as recited in claim 1 wherein said non-crystalline copolymer has a glass transition temperature at less than about −60° C.

4. A method as recited in claim 1 wherein said non-crystalline copolymer has a glass transition temperature at about −65° C.

5. A method as recited in claim 1 wherein said non-crystalline copolymer has a 1,3-dioxolane content of about 70 mol percent, an intrinsic viscosity greater than about 1.0 and a glass transition temperature at about −65° C.

6. A method as recited in any one of claims 1–5, inclusive, wherein said crystalline oxymethylene polymer is one in which oxymethylene groups comprise at least about 85 percent of the polymer's recurring units.

7. A method as recited in claim 6 wherein said crystalline oxymethylene polymer is an end-capped oxymethylene homopolymer.

8. A method as recited in claim 6 wherein said crystalline oxymethylene polymer is an oxymethylene copolymer having oxymethylene groups interspersed with oxy(higher)alkylene groups represented by the general formula:

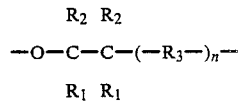

wherein each $R_1$ and $R_2$ is hydrogen or a lower alkyl group, each $R_3$ is a methylene, oxymethylene, lower alkyl-substituted methylene or lower alkyl-substituted oxymethylene group, and n is an integer from zero to three, inclusive.

9. A method as recited in claim 8 wherein said crystalline oxymethylene polymer is an oxymethylene copolymer consisting essentially of oxymethylene groups interspersed with oxy(higher)alkylene groups represented by said general formula.

10. A method as recited in claim 9 wherein said crystalline oxymethylene polymer is a copolymer of trioxane and ethylene oxide.

11. A method as recited in claim 9 wherein said crystalline oxymethylene polymer is a copolymer of trioxane and 1,3-dioxolane.

12. A method as recited in claim 6 wherein said crystalline oxymethylene polymer is an oxymethylene terpolymer.

13. A method as recited in claim 12 wherein said terpolymer is one having oxymethylene groups, oxy(higher)alkylene groups represented by the general formula:

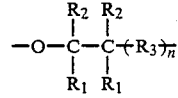

wherein each $R_1$ and $R_2$ is hydrogen or a lower alkyl group, each $R_3$ is a methylene, oxymethylene, lower alkyl-substituted methylene or lower alkyl-substituted oxymethylene group, and n is an integer from zero to three, inclusive, and a different, third group interpolymerizable with oxymethylene and oxy(higher)alkylene groups.

14. A method as recited in claim 13 wherein said different, third group is a bifunctional group.

15. A method as recited in claim 14 wherein said bifunctional group is derived from a diglycide of the general formula:

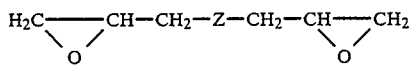

wherein Z represents a carbon-to-carbon bond, an oxygen atom, an oxyalkoxy group of 1 to 8 carbon atoms, inclusive, an oxycycloalkoxy group of 4 to 8 carbon atoms, inclusive, or an oxypoly(lower alkoxy) group having 2 to 4 recurring lower alkoxy groups each with 1 or 2 carbon atoms.

16. A method as recited in claim 12 wherein said crystalline oxymethylene polymer is a terpolymer of trioxane, ethylene oxide and butanediol diglycidyl ether.

17. A method as recited in claim 1 wherein the coated surface and the other surface with which it is contacted are subjected to a pressure of from about 500 psi to about 20,000 psi at a temperature of from about 100° C. to about 250° C. for from about 0.5 minute to about 15 minutes.

18. A method as recited in claim 17 wherein said non-crystalline copolymer is dissolved in hexafluoroisopropanol.

19. A bonded article made from at least two articles shaped or molded from a crystalline oxymethylene polymer, bonded together with a low Tg non-crystalline copolymer of trioxane and 1,3-dioxolane having a 1,3-dioxolane content greater than 65 mol percent and less than about 75 mol percent, said percentages being based on the total mols of trioxane and 1,3-dioxolane present in said copolymer, and an intrinsic viscosity of from about 1.0 to about 2.3.

20. A bonded article as recited in claim 19 wherein said non-crystalline copolymer has an intrinsic viscosity greater than about 1.0.

21. A bonded article as recited in claim 19 wherein said non-crystalline copolymer has a glass transition temperature at less than about 31 60° C.

22. A bonded article as recited in claim 19 wherein said non-crystalline copolymer has a glass transition temperature at about −65° C.

23. A bonded article as recited in claim 19 wherein said non-crystalline copolymer has a 1,3-dioxolane content of about 70 mol percent, an intrinsic viscosity greater than about 1.0 and a glass transition temperature at about −65° C.

24. A bonded article as recited in any one of claims 19-23, inclusive, wherein said crystalline oxymethylene polymer is one in which oxymethylene groups comprise at least about 85 percent of the polymer's recurring units.

25. A bonded article as recited in claim 24 wherein said crystalline oxymethylene polymer is an end-capped oxymethylene homopolymer.

26. A bonded article as recited in claim 24 wherein said crystalline oxymethylene polymer is an oxymethylene copolymer having oxymethylene groups interspersed with oxy(higher)alkylene groups represented by the general formula:

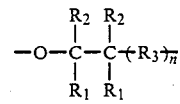

wherein each $R_1$ and $R_2$ is hydrogen or a lower alkyl group, each $R_3$ is a methylene, oxymethylene, lower alkyl-substituted methylene or lower alkyl-substituted oxymethylene group, and n is an integer from zero to three, inclusive.

27. A bonded article as recited in claim 26 wherein said crystalline oxymethylene polymer is an oxymethylene copolymer consisting essentially of oxymethylene groups interspersed with oxy(higher)alkylene groups represented by said general formula.

28. A bonded article as recited in claim 27 wherein said crystalline oxymethylene polymer is a copolymer of trioxane and ethylene oxide.

29. A bonded article as recited in claim 27 wherein said crystalline oxymethylene polymer is a copolymer of trioxane and 1,3-dioxolane.

30. A bonded article as recited in claim 24 wherein said crystalline oxymethylene polymer is an oxymethylene terpolymer.

31. A bonded article as recited in claim 30 wherein said terpolymer is one having oxymethylene groups, oxy(higher) alkylene groups represented by the general formula:

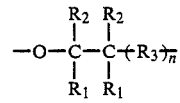

wherein each $R_1$ and $R_2$ is hydrogen or a lower alkyl group, each $R_3$ is a methylene, oxymethylene, lower alkyl-substituted methylene or lower alkyl-substituted oxymethylene group, and n is an integer from zero to three, inclusive, and a different, third group interpolymerizable with oxymethylene and oxy(higher)alkylene groups.

32. A bonded article as recited in claim 31 wherein said different, third group is a bifunctional group.

33. A bonded article as recited in claim 32 wherein said bifunctional group is derived from a diglycide of the general formula:

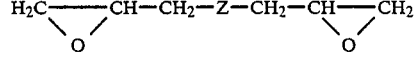

wherein Z represents a carbon-to-carbon bond, an oxygen atom, an oxyalkoxy group of 1 to 8 carbon atoms, inclusive, an oxycycloalkoxy group of 4 to 8 carbon atoms, inclusive, or an oxypoly(lower alkoxy) group having 2 to 4 recurring lower alkoxy groups each with 1 or 2 carbon atoms.

34. A bonded article as recited in claim 30 wherein said crystalline oxymethylene polymer is a terpolymer of trioxane, ethylene oxide and butanediol diglycidyl ether.

* * * * *